(12) United States Patent
Imafuji

(10) Patent No.: US 8,459,884 B2
(45) Date of Patent: Jun. 11, 2013

(54) INTERCHANGEABLE LENS

(75) Inventor: Kazuharu Imafuji, Kawasaki (JP)

(73) Assignee: Nikon Corporation, Tokyo (JP)

( * ) Notice: Subject to any disclaimer, the term of this patent is extended or adjusted under 35 U.S.C. 154(b) by 36 days.

(21) Appl. No.: 13/029,764

(22) Filed: Feb. 17, 2011

(65) Prior Publication Data

US 2011/0229118 A1    Sep. 22, 2011

(30) Foreign Application Priority Data

Mar. 18, 2010 (JP) .................................. 2010-062735
Jan. 12, 2011 (JP) .................................. 2011-004126

(51) Int. Cl.
*G03B 17/00* (2006.01)

(52) U.S. Cl.
USPC .......................................... 396/529; 396/532

(58) Field of Classification Search
USPC .................................. 396/529, 532
See application file for complete search history.

(56) References Cited

U.S. PATENT DOCUMENTS

| | | | |
|---|---|---|---|
| 4,608,630 A | 8/1986 | Schott | |
| 4,860,113 A * | 8/1989 | Miyamoto et al. | 348/187 |
| 4,922,283 A | 5/1990 | Fukui | |
| 4,945,376 A | 7/1990 | Kawasaki et al. | |
| 5,060,005 A * | 10/1991 | Itoh et al. | 396/303 |
| 5,126,780 A | 6/1992 | Satou et al. | |
| 5,157,599 A * | 10/1992 | Miyamoto | 358/471 |
| 5,402,174 A * | 3/1995 | Takahashi | 348/347 |
| 6,128,443 A * | 10/2000 | Higuma | 396/91 |
| 6,130,994 A * | 10/2000 | Maruyama | 396/60 |
| 6,546,206 B2 * | 4/2003 | Murakami | 396/260 |
| 6,707,992 B2 | 3/2004 | Uenaka et al. | |
| 7,736,073 B2 * | 6/2010 | Tsuda | 396/529 |
| 7,787,043 B2 * | 8/2010 | Moriya | 348/335 |
| 8,251,602 B2 | 8/2012 | Ueda et al. | |
| 2002/0021898 A1 * | 2/2002 | Teramoto | 396/310 |
| 2004/0202464 A1 | 10/2004 | Miyasaka et al. | |
| 2006/0171707 A1 * | 8/2006 | Higuma | 396/529 |
| 2009/0238553 A1 * | 9/2009 | Tamura | 396/296 |
| 2009/0269049 A1 | 10/2009 | Ueda et al. | |

FOREIGN PATENT DOCUMENTS

| | | |
|---|---|---|
| JP | A-04-323975 | 11/1992 |
| JP | A-07-191354 | 7/1995 |
| JP | A-2008-97006 | 4/2008 |
| JP | A-2009-053429 | 3/2009 |

OTHER PUBLICATIONS

Jan. 10, 2012 Office Action issued in Japanese Patent Application No. 2011-004126 (with translation).
Apr. 4, 2013 Office Action issued in U.S. Appl. No. 13/757,132.

* cited by examiner

*Primary Examiner* — Rodney Fuller
(74) *Attorney, Agent, or Firm* — Oliff & Berridge, PLC

(57) ABSTRACT

An interchangeable lens to be removably attached to a camera body, includes: a receiving device that receives predetermined control data from the camera body through a first transmission path; a control device that executes predetermined control processing based upon the control data upon reception of the control data by the receiving device; a generation device that executes at predetermined intervals generation processing for generating predetermined lens data which indicates an operating state of the interchangeable lens; a transmission device that transmits the lens data to the camera body through a second transmission path, which is different from the first transmission path, upon generation of the lens data by the generation device; and a prioritizing device that gives priority to the generation processing by the generation device over the control processing by the control device.

14 Claims, 7 Drawing Sheets

US 8,459,884 B2

INTERCHANGEABLE LENS

INCORPORATION BY REFERENCE

The disclosures of the following priority applications are herein incorporated by reference:

Japanese Patent Application No. 2010-062735 filed Mar. 18, 2010

Japanese Patent Application No. 2011-004126 filed Jan. 12, 2011

BACKGROUND OF THE INVENTION

1. Field of the Invention

The present invention relates to an interchangeable lens to be removably attached to a camera body.

2. Description of Related Art

There is a known technique that, in a camera system constituted with a camera body and an interchangeable lens, the camera body drives a focusing lens in the interchangeable lens so as to perform auto focusing. To perform the auto focusing, the camera body needs to obtain position information of the focusing lens from the interchangeable lens. Japanese Laid Open Patent Publication No. 2008-97006, for example, states a taking lens in which the drive system of the focusing lens is provided with a movement signal generator constituted with an encoder and the like. This movement signal generator outputs a two-phase pulse signal of positive and negative in accordance with back and forth movement of the focusing lens, The output pulse signal is transmitted to a body-side control section in the camera body. The camera body can detect the movement distance of the focusing lens from the pulse signal in units of the number of pulses.

Japanese Laid Open Patent Publication No. 2008-97006 states a structure in which an encoder must be added for each optical member if information on a drive status of an optical member other than the focusing lens is transmitted to the camera body. Since addition of the encoder results in increases in manufacturing cost and in housing size, consideration is being made as to, in place of the encoder, an introduction of a new transmission path through which information on the drive status of the optical member is transmitted.

SUMMARY OF THE INVENTION

In introducing the new transmission path through which information on the drive status of the optical member is transmitted, a CPU in the interchangeable lens is required to control two transmission paths, i.e., a transmission path for controlling and the new transmission path. Conventional techniques are not designed to address as to what control may handle a situation in which processing to control each of the two transmission paths occurs simultaneously.

An interchangeable lens to be removably attached to a camera body according to a first aspect of the present invention comprises: a receiving device that receives predetermined control data from the camera body through a first transmission path; a control device that executes predetermined control processing based upon the control data upon reception of the control data by the receiving device; a generation device that executes at predetermined intervals generation processing for generating predetermined lens data which indicates an operating state of the interchangeable lens; a transmission device that transmits the lens data to the camera body through a second transmission path, which is different from the first transmission path, upon generation of the lens data by the generation device; and a prioritizing device that gives priority to the generation processing by the generation device over the control processing by the control device.

According to a second aspect of the present invention, in the interchangeable lens according to the first aspect, it is preferable that the prioritizing device causes the control device to suspend the control processing if the generation processing by the generation device is started during execution of the control processing by the control device.

According to a third aspect of the present invention, in the interchangeable lens according to the second aspect, after suspending the control processing by the control device, the prioritizing device may resume the control processing upon completion of the generation processing by the generation device.

According to a fourth aspect of the present invention, in the interchangeable lens according to the first aspect, it is preferable that the prioritizing device does not cause the control device to start the control processing during execution of the generation processing by the generation device.

According to a fifth aspect of the present invention, in the interchangeable lens according to the first aspect, the control device and the generation device may include a common processing device that executes the control processing and the generation processing.

According to a sixth aspect of the present invention, in the interchangeable lens according to the first aspect, the control data may be constituted with a plurality of pieces of partial data; and the control device may execute the control processing based upon the partial data every time the partial data is received by the receiving device.

According to a seventh aspect of the present invention, in the interchangeable lens according to the first aspect, it is preferable that the generation processing includes processing for outputting to the transmission device a transmission instruction signal which indicates a transmission instruction of the lens data having been generated; and the transmission device, upon input of the transmission instruction signal, transmits the generated lens data to the camera body through the second transmission path.

According to a eighth aspect of the present invention, the interchangeable lens according to the first aspect may further comprise a response data transmission device that transmits response data corresponding to the predetermined control data to the camera body through the first transmission path, wherein; the first transmission path is a full-duplex transmission path which allows therethrough transmission of the response data by the response data transmission device along with reception of the predetermined control data by the receiving device.

DESCRIPTION OF PREFERRED EMBODIMENTS (First Embodiment)

Figure 1:
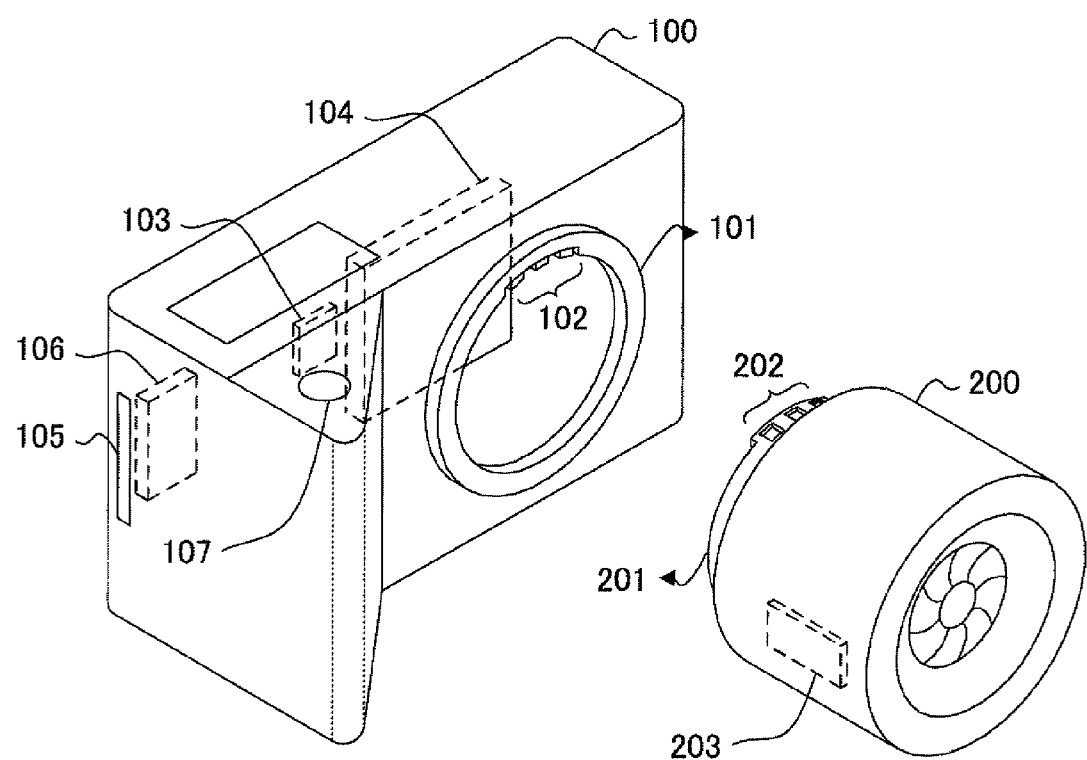
FIG. 1 is an external view of a camera system according to a first embodiment of the present invention.

FIG. 1 is an external view of a camera system according to the first embodiment of the present invention. A camera system 1 is constituted with a camera body 100 and an interchangeable lens 200. The interchangeable lens 200 is to be removably attached to the camera body 100. The interchangeable lens 200 is attached by fitting a lens-side lens mount 201 of the interchangeable lens into a body-side lens mount 101 of the camera body 100.

The body-side lens mount 101 is provided with a plurality of contacts 102 for data communication and power supply. The lens-side lens mount 201 is provided with a plurality of contacts 202 corresponding to the plurality of contacts 102, When the interchangeable lens 200 is attached to the camera body 100, the contacts 102 and the contacts 202 are connected. As a result, electric power for actuating the interchangeable lens 200 is supplied from the camera body 100 to the interchangeable lens 200 and, as described later, data communication is enabled between the camera body 100 and the interchangeable lens 200.

The camera body 100 includes a body CPU 103. The body CPU 103 controls each section of the camera body 100 by executing a predetermined control program. On the other hand, the interchangeable lens 200 includes a lens CPU 203. The lens CPU 203 executes a predetermined control program so as to control each section of the interchangeable lens 200 and perform control processing and generation processing, which are described later.

An image sensor 104 captures a subject image and outputs an image signal. When a release switch 107, which is provided on the camera body 100, is pressed down, the body CPU 103 performs a variety of image processing to the image signal and creates image data. The created image data is stored into a portable storage medium 106 in a storage medium insertion slot 105.

Figure 2:
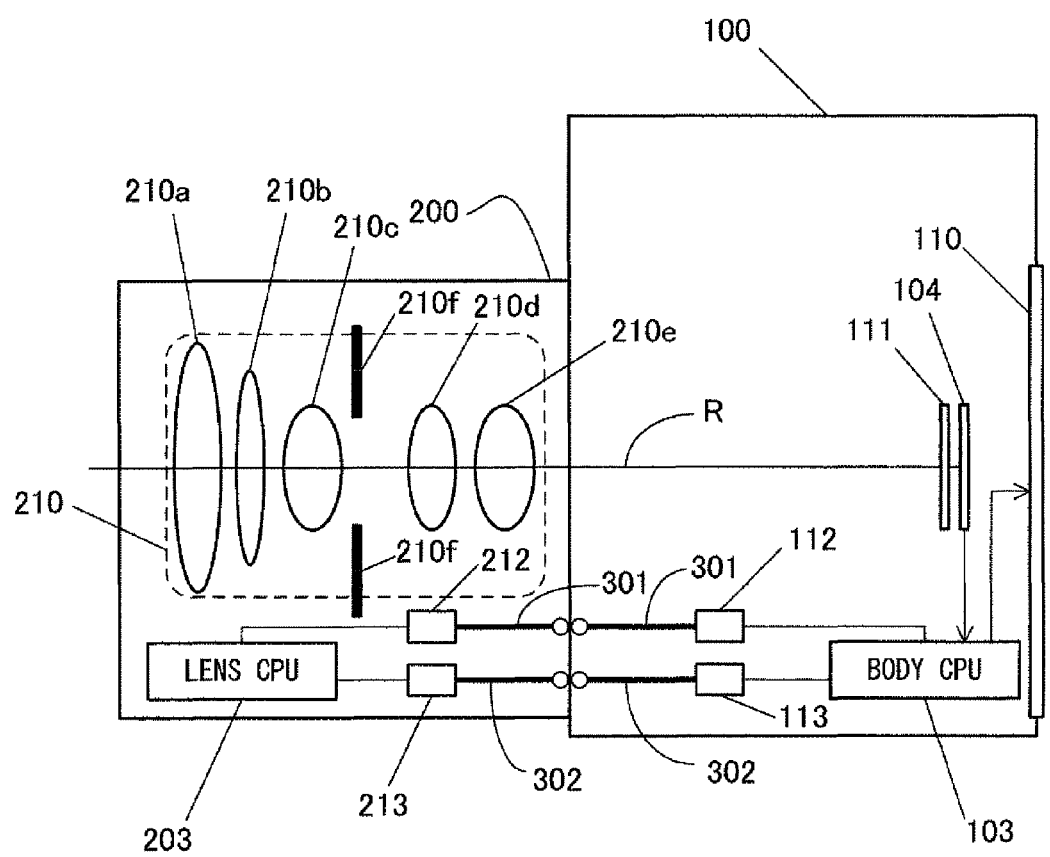
FIG. 2 is a sectional view showing the structure of the camera system according to the first embodiment.

FIG. 2 is a sectional view showing the structure of the camera system 1 according to the first embodiment. The interchangeable lens 200 includes a built-in imaging optical system 210, which is constituted with a plurality of lenses 210a to 210e, and a built-in aperture 210f. Of the plurality of lenses, for example, the lens 210d is a focusing lens to be driven along the direction of an optical axis R of the optical system 210 for focusing. In addition, the lens 210e is a lens for image blur correction, which can be moved along the movement direction including a component in the direction (X, Y directions) perpendicular to the optical axis R of the imaging optical system 210. In addition, the aperture 210f is an aperture member (aperture blade) which can be moved so as to change the size of an aperture opening through which a subject light flux passes. In accordance with an instruction from the body CPU 103, the lens CPU 203 causes an actuator (motor or the like) not shown in the figures to drive members to be driven such as the focusing lens 210d, the image blur correction lens 210e, and the aperture 210f. The lens CPU 203 controls drive and position detection of each of the above-described members to be driven.

It is to be noted that the interchangeable lens 200 may be configured as a motorized zoom lens. In this case, a zooming lens which is a member movable along the optical axis direction of the imaging optical system 210 of the interchangeable lens 210, similarly to the focusing lens 210b, and a mechanism (power zoom mechanism) which electrically drives the zooming lens are disposed in the interchangeable lens 200.

At the front of the image sensor 104, a filter 111 is disposed, in which an optical low-pass filter and an infrared cut filter are incorporated. Subject light passes through the imaging optical system 210 in the interchangeable lens 200 and then enters the image sensor 104 through the filter 111 around the optical axis R. The body CPU 103 creates an image for display from an image signal output by the image sensor 104, and displays it on an LCD module 110 disposed on the rear surface of the camera body 100.

Two transmission paths are provided between the body CPU 103 and the lens CPU 203, i.e., between the camera body 100 and the interchangeable lens 200 through the contacts 102 and the contacts 202 shown in FIG. 1. Since those two transmission paths are independent of each other, even when one of the transmission paths is being engaged in transmitting data therethrough, the other transmission path can be engaged in transmitting other data. In the explanation below, the two transmission paths will be referred to as a first transmission path 301 and a second transmission path 302, respectively. In addition, communication performed through the first transmission path 301 will be referred to as "command data communication" and communication performed through the second transmission path 302 will be referred to as "hotline communication". Signal lines constituting the first transmission path 301 and the second transmission path 302 and specific communication contents of the command data communication and hotline communication will be described later in detail.

A body-side first communication circuit 112, which performs the command data communication, and a body-side second communication circuit 113, which performs the hotline communication, are provided in the camera body 100. These circuits are each connected to the body CPU 103. Similarly, a lens-side first communication circuit 212, which performs the command data communication, and a lens-side second communication circuit 213, which performs the hotline communication, are provided in the interchangeable lens 200. These circuits are each connected to the lens CPU 203.

The body-side first communication circuit 112 and the lens-side first communication circuit 212 are connected with each other through the first transmission path 301. Similarly, the body-side second communication circuit 113 and the lens-side second communication circuit 213 are connected with each other through the second transmission path 302. The lens-side first communication circuit 212 receives control data which will be described later from the body-side first communication circuit 112 in the camera body 100 through the first transmission path 301 and transmits control data prepared in the interchangeable lens 200.

In other words, each of the body-side first communication circuit 112 and the body-side second communication circuit 113 is a body-side communication interface. Similarly, each of the lens-side first communication circuit 212 and the lens-side second communication circuit 213 is an interchangeable lens-side communication interface. The body CPU 103 and the lens CPU 203 use each of those communication interfaces so as to perform communications (hotline communication and command data communication) described later between them.

(Explanation on Transmission Paths)

Figure 3:
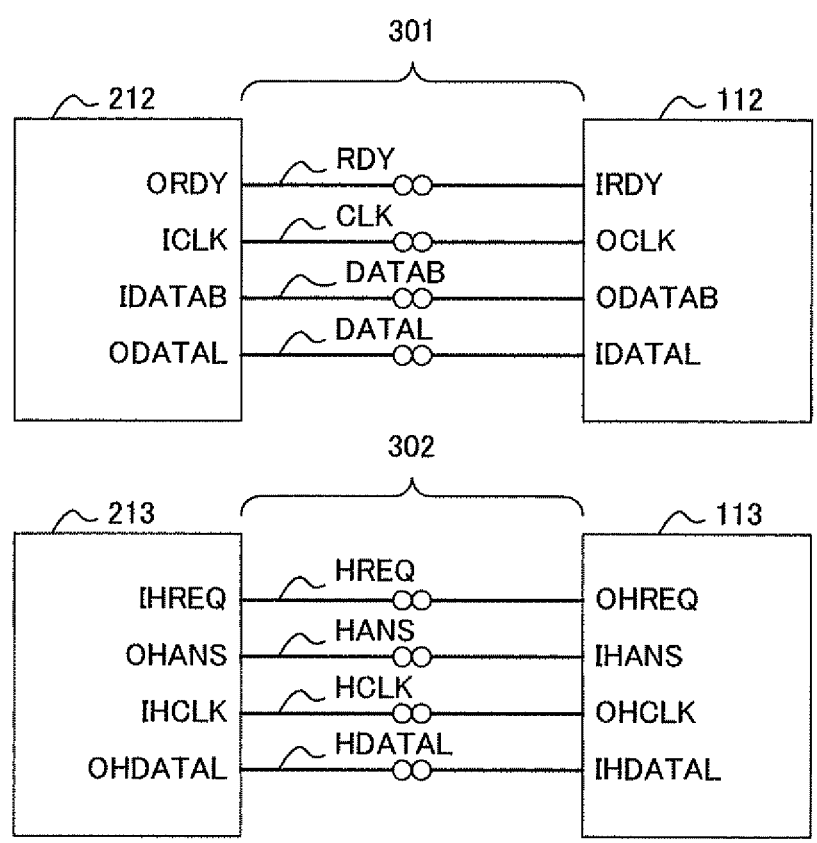
FIG. 3 is a block diagram showing transmission paths between a camera body and an interchangeable lens in detail.

FIG. 3 is a block diagram showing transmission paths between the camera body 100 and the interchangeable lens 200 in detail. The lens-side first communication circuit 212 includes four communication terminals ORDY, ICLK, IDATAB, and ODATAL. The body-side first communication circuit 112 includes four communication terminals IRDY, OCLK, ODATAB, and IDATAL, which correspond to the above terminals. The first transmission path 301 is constituted with four signal lines RDY, CLK, DATAB, and DATAL, which connect those four pairs of communication terminals, respectively. That is, the command data communication is performed using those four signal lines.

Through the signal line RDY, the lens-side first communication circuit 212 transmits permission/denial for starting communication. Through the signal line CLK, the body-side first communication circuit 112 transmits a clock signal for data communication. Through the signal line DATAB, the body-side first communication circuit 112 transmits a data signal. Through the signal line DATAL, the lens-side first communication circuit 212 transmits a data signal.

Similarly, the lens-side second communication circuit 213 includes four communication terminals IHREQ, OHANS, IHCLK, and OHDATAL. The body-side second communication circuit 113 includes four communication terminals OHREQ, IHANS, OHCLK, and IHDATAL, which correspond to the above terminals. The second transmission path 302 is constituted with four signal lines HREQ, HANS, HCLK, and HDATAL, which connect those four pairs of communication terminals, respectively. That is, the hotline communication is performed using those four signal lines.

Through the signal line HREQ, the body-side second communication circuit 113 transmits a signal requesting to start communication. Through the signal line HANS, the lens-side second communication circuit 213 transmits a signal indicating readiness for communication. Through the signal line HCLK, the body-side second communication circuit 113 transmits a clock signal for data communication, Through the signal line HDATAL, the lens-side second communication circuit 213 transmits a data signal.

(Explanation on Command Data Communication)

In the command data communication, the body-side first communication circuit 112 and the lens-side first communication circuit 212 transmit data signals simultaneously with each other in synchronization with a clock signal output by the body-side first communication circuit 112. That is, the command data communication is a full-duplex data communication, in which data are transmitted simultaneously and bi-directionally.

In the present embodiment, a piece of data transferred via the command data communication is constituted with two pieces of partial data. In the explanation below, the first piece of partial data is referred to as a command packet and the second piece of partial data is referred to as a data packet. In addition, the command packet and the data packet are collectively referred to as control data. That is, the command data communication is a communication in which control data is transmitted and received between the camera body 100 and the interchangeable lens 200. Every time partial data is received by the lens-side first communication circuit 212, the lens CPU 203 executes control processing (described later) based upon the received partial data.

The command packet is a piece of data indicating an instruction from the body CPU 103 to the lens CPU 203. In the present embodiment, the command packet is 5 bytes of data, 1 byte of which is a checksum of the other four bytes. It is to be noted that in the present embodiment, the command packet, which is transmitted from the lens CPU 203 to the body CPU 103, is dummy data. More specifically, the lens CPU 203 transmits "0s" of 4 bytes and a checksum of 1 byte as the command packet.

In the present embodiment, the command packet, transmitted from the body CPU 103, is either an instruction to drive a member included in the interchangeable lens 200 or an instruction to transmit information about the interchangeable lens 200. The former instruction includes an instruction to drive the focusing lens 210d and the image blur correction lens 210e and an instruction to drive the aperture 210f. The latter instruction includes an instruction to transmit a command to ask the interchangeable lens 200 to transmit information (an instruction to transmit e.g., the model name of the interchangeable lens 200, focal length information (zoom position information), aperture position, and lens property information (optical aberration information)).

The data packet is data to be transmitted in association with the command packet, and its content depends upon the content of the command packet. For instance, if the command packet transmitted from the body CPU 103 indicates an instruction to drive the focusing lens 210d, the data packet subsequently transmitted by the body CPU 103 is data indicating the driving amount and driving direction of a target to be driven (e.g., the focusing lens 210d, the image blur correction lens 210e, the aperture 210f, and the like, which are hereinafter referred to as a target to be driven), and the data packet transmitted by the lens CPU 203 is all-zero dummy data (including the checksum). In addition, if the command packet transmitted from the body CPU 103 indicates an instruction to send lens information (e.g., the model name of the interchangeable lens 200), the data packet subsequently transmitted by the body CPU 103 is all-zero dummy data (including the checksum), and the data packet transmitted by the lens CPU 203 is data indicating the lens information (e.g., string data indicating the model name of the interchangeable lens 200) and the checksum. It is to be noted that the checksum of 1 byte is added to the data packet similarly to the command packet.

Figure 4:
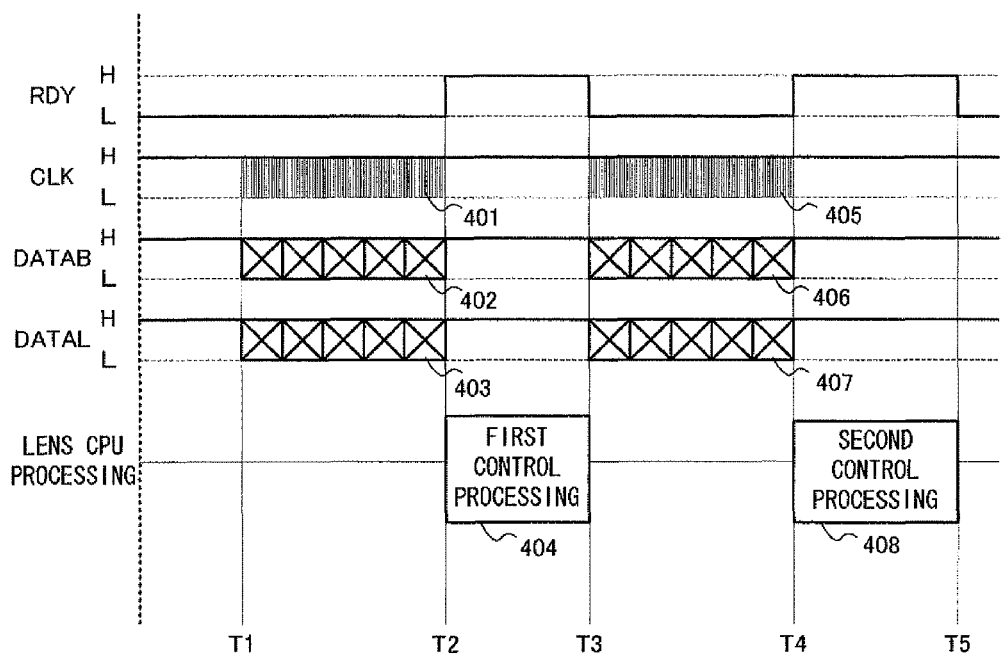
FIG. 4 is a waveform diagram showing command data communication.

FIG. 4 is a waveform diagram showing the command data communication. The command data communication is started by the body CPU 103. The body CPU 103 at first writes into a buffer memory provided in the body-side first communication circuit 112 the command packet to be transmitted. The body CPU 103 next transmits a transmission start signal to the body-side first communication circuit 112. Upon receiving the transmission start signal, the body-side first communication circuit 112 confirms the signal level of the signal line RDY The lens-side first communication circuit 212 sets the signal level of the signal line RDY to H if the communication is not ready. When the signal level of the signal line RDY is H, the body-side first communication circuit 112 does not perform transmission of each signal before the signal level thereof becomes L.

When the signal level of the signal line RDY is L, the body-side first communication circuit 112 starts transmitting a clock signal 401 and a command packet signal 402 (a time point T1 of FIG. 4). Here, the command packet signal 402 is a serial signal indicating the above command packet (including the checksum). The clock signal 401 and the command packet signal 402 are transmitted through the signal line CLK and the signal line DATAB, respectively. At this time, a command packet of 5 bytes (including the checksum) has been written into the buffer memory in the body-side first communication circuit 112. As a result, the clock signal 401 and the command packet signal 402 are each 5 bytes long.

The lens-side first communication circuit 212 transmits a command packet signal 403 through the signal line DATAL in synchronization with the clock signal 401 having been transmitted by the body-side first communication circuit 112. As described earlier, the command packet transmitted from the lens-side first communication circuit 212 is of 5 bytes ("0s" of 4 bytes and the checksum of 1 byte). Therefore the command packet signal 403 is a serial signal of the same length as that of the command packet signal 402, i.e., 5 bytes.

The body-side first communication circuit 112 receives the command packet signal 403 having been transmitted through the signal line DATAL, and writes data (including the checksum) indicated by the signal into the buffer memory in the body-side first communication circuit 112. Similarly, the lens-side first communication circuit 212 receives the command packet signal 402 having been transmitted through the signal line DATAB, and writes data indicated by the signal into a buffer memory in the lens-side first communication circuit 212. Transmission and reception of those data are performed by the body-side first communication circuit 112 and the lens-side first communication circuit 212. In other words, the body CPU 103 and the lens CPU 203 can execute other processing while transmitting and receiving those data.

Upon completion of transfer of the command packet, the lens-side first communication circuit 212 sets the signal level of the signal line RDY to H, and generates interrupt for completion of transmission and reception on the lens CPU 203 (a time point T2 of FIG. 4). In response to this interrupt, the lens CPU 203 starts executing a first control processing 404.

The first control processing 404 is processing to get transmission of the data packet ready. In the first control processing 404, the lens CPU 203 reads the received command packet from the buffer memory in the lens-side first communication circuit 212, and writes it into a main memory (not shown in the figures). Based upon the content of this command packet (analyzing the content of the command packet), the lens CPU 203 then writes into the above buffer memory the data packet (including the checksum) to be subsequently transmitted.

For instance, if the received command packet indicates an instruction to drive any of the above targets to be driven, the lens CPU 203 writes all-zero dummy data (including the checksum) into the above buffer memory. In addition, if the receive command packet indicates an instruction to transmit lens information (e.g., the model name of the interchangeable lens 200), the lens CPU 203 writes into the above buffer memory the data (e.g., string data indicating the model name of the interchangeable lens 200) indicating requested lens information and the checksum. It is to be noted that the lens information written here into the buffer memory is transmitted to the camera body 100 through full-duplex communication behind the communication of a data part of the command data communication described later.

It is to be noted that the first control processing 404 performed by the lens CPU 203 includes communication error checking processing, in which the checksum included in the command packet signal 402 is used to check from the number of data bytes with ease as to whether or not an error has occurred in communication of the command packet signal 402.

On the other hand, upon completion of transfer of the command packet, the body-side first communication circuit 112 also generates interrupt for completion of transmission and reception on the body CPU 103. In response to this interrupt, the body CPU 103 writes into the buffer memory provided in the body-side first communication circuit 112 the data packet corresponding to the content of the transmitted command packet. For example, if the transmitted command packet indicates an instruction to drive any of the above targets to be driven, the body CPU 103 writes into the above buffer memory data (including the checksum) indicating the driving amount and driving direction of the target to be driven. In addition, if the transmitted command packet indicates an instruction to transmit the model name of the interchangeable lens 200, the body CPU 103 writes all-zero dummy data (including the checksum) into the buffer memory.

Next, the body CPU 103 transmits a transmission start signal to the body-side first communication circuit 112. However, since the signal level of the signal line RDY is H at this time point (the time point T2 of FIG. 4), the body-side first communication circuit 112 does not start transmitting a data packet signal.

Upon completion of the first control processing 404, the lens CPU 203 transmits a transmission permission signal to the lens-side first communication circuit 212. Upon receipt of the transmission permission signal, the lens-side first communication circuit 212 sets the signal level of the signal line RDY from H to L (a time point T3 of FIG. 4). As a result, the body-side first communication circuit 112 starts transmitting a clock signal 405 and a data packet signal 406, similarly to a command packet. Here, the data packet signal 406 is a serial signal indicating a data packet written into the buffer memory by the body CPU 103. In addition, the lens-side first communication circuit 212 also starts transmitting a data packet signal 407 in response to the clock signal 405. Here, the data packet signal 407 is a serial signal indicating a data packet written into the buffer memory by the lens CPU 203.

Upon completion of transfer of the data packet, similarly to the case of the command packet, the lens-side first communication circuit 212 sets the signal level of the signal line RDY to H, and generates interrupt for completion of transmission and reception on the lens CPU 203 (a time point T4 of FIG. 4). In response to this interrupt, the lens CPU 203 starts executing a second control processing 408. The second control processing 408 is processing based upon the received data packet. In the second control processing 408, the lens CPU 203 reads the received data packet from the buffer memory in the lens-side first communication circuit 212, and writes it into the main memory (not shown in the figures). The second control processing 408 also includes communication error checking processing as described above, which uses the checksum included in the data packet signal 406.

After that, the lens CPU 203 performs appropriate control based upon the command packet which was received previously and the data packet which was received this time. More specifically, in response to reception of the control data by the lens-side first communication circuit 212, the lens CPU 203 executes control processing based upon the control data.

For example, if the received command packet indicates an instruction to drive any of the above targets to be driven, the lens CPU 203, based upon the movement amount and movement direction indicated by the data packet, drives the target to be driven. In addition, if the received command packet indicates an instruction to transmit lens information (e.g., the model name of the interchangeable lens 200), the lens CPU 203 performs integrity checking processing of the data packet in which the checksum included in the data packet is used and processing to delete received packets from the buffer for receiving in preparation for next communication.

On the other hand, upon completion of transfer of the data packet, the body-side first communication circuit 112 also generates interrupt for completion of transmission and reception on the body CPU 103. In response to this interrupt, the body CPU 103 executes processing according to the content of the transmitted command packet if necessary. For instance, if the transmitted command packet indicates an instruction to drive any of the above targets to be driven, the body CPU 103 performs nothing at all. In addition, if the transmitted command packet indicates an instruction to transmit lens information (e.g., the model name of the interchangeable lens 200), the body CPU 103 writes the model name into the main memory (not shown in the figures) and writes it into the portable storage medium 106.

(Explanation on Hotline Communication)

In the hotline communication, the lens-side second communication circuit 213 transmits a data signal uni-directionally in synchronization with a clock signal output by the body-side second communication circuit 113. In other words, the hotline communication is a uni-directional data communication in which data are transmitted from the interchangeable lens 200 to the camera body 100.

When performing the hotline communication, the lens CPU 203 executes processing to generate lens data indicating an operation status of the interchangeable lens 200. The lens data of the present embodiment is data of 5 bytes indicating a position change amount of the focusing lens 210*d*.

Figure 5A:
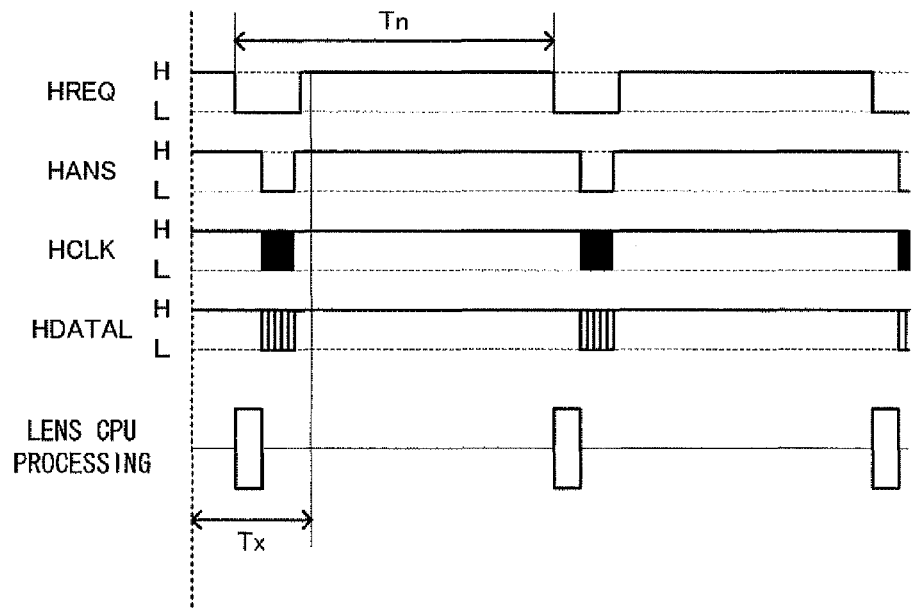
FIGS. 5A and 5B are waveform diagrams showing hotline communication.
Figure 5B:
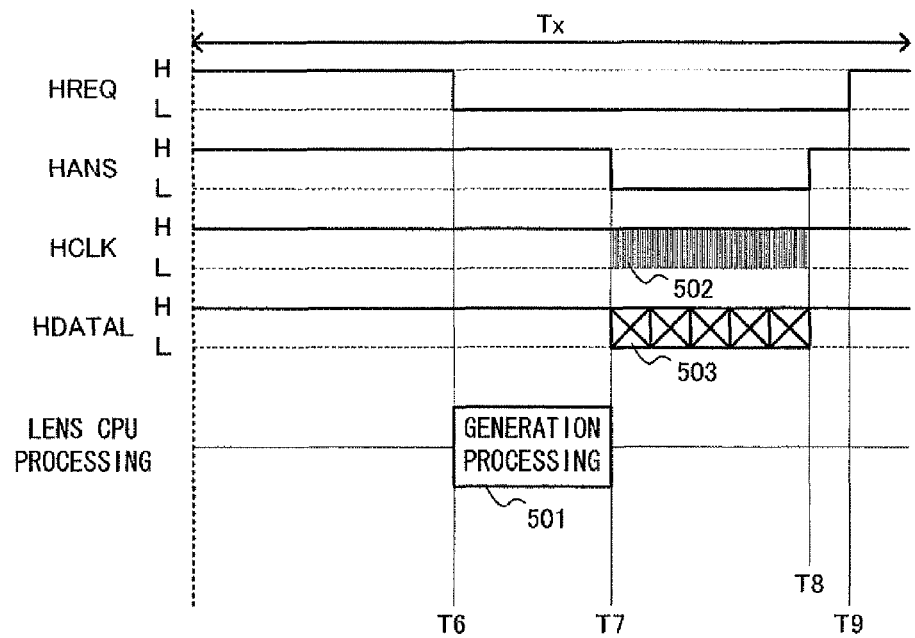

FIGS. 5A and 5B are waveform diagrams showing the hotline communication. It is to be noted that FIG. 5B is an enlarged figure of a period of time Tx of FIG. 5A. The hotline communication, similarly to the command data communication, is started by the body CPU 103. The body CPU 103 at first transmits a communication start signal to the body-side second communication circuit 113. Upon reception of the communication start signal, the body-side second communication circuit 113 sets the signal level of the signal line HREQ from H to L (a time point T6 of FIG. 5B).

In response to the signal level of the signal line HREQ having been set from H to L, the lens-side second communication circuit 213 generates interrupt for a communication request on the lens CPU 203. Upon reception of this interrupt, the lens CPU 203 starts executing a generation processing 501 to generate lens data. In the generation processing 501, the lens CPU 203 obtains the position change amount of the focusing lens 210*d* from the time point at which a last hotline communication was completed, and writes it into a buffer memory in the lens-side second communication circuit 213.

At the end of the generation processing 501, the lens CPU 203 outputs a transmission instruction signal to the lens-side second communication circuit 213. That is, the generation processing 501 includes processing to output a transmission instruction signal. The transmission instruction signal is a signal indicating a transmission instruction of the generated lens data. Upon reception of the transmission instruction signal, the lens-side second communication circuit 213 sets the signal level of the signal line HANS from H to L (a time point T7 of FIG. 5B).

In response to the signal level of the signal line HANS having been set from H to L, the body-side second communication circuit 113 starts transmitting a clock signal 502. The clock signal 502 is transmitted through the signal line HCLK. As described earlier, lens data is data of 5 bytes in the present embodiment. The clock signal 502 is thus 5 bytes long.

The lens-side second communication circuit 213 transmits a lens data signal 503 through the signal line HDATAL in synchronization with the clock signal 502 having been transmitted by the body-side second communication circuit 113. The lens data signal 503 is a serial signal, of 5 bytes indicating lens data. More specifically, the lens-side second communication circuit 213 transmits the lens data to the body-side second communication circuit 113 in the camera body 100 through the second transmission path 302 in response to the generation of the lens data by the lens CPU 203.

The body-side second communication circuit 113 receives the lens data signal 503 having been transmitted through the signal line HDATAL and writes data indicated by the signal into a buffer memory in the body-side second communication circuit 113. Transmission and reception of the lens data are performed by the body-side second communication circuit 113 and the lens-side second communication circuit 213. In other words, the body CPU 103 and the lens CPU 203 can execute other processing while transmitting and receiving the lens data.

Upon completion of transfer of the lens data, the lens-side second communication circuit 213 sets the signal level of the signal line HANS to H (a time point T8 of FIG. 5B). In addition, the body-side second communication circuit 113 generates interrupt for communication completion on the body CPU 103. In response to this interrupt, the body CPU 103 reads the lens data having been received from the buffer memory in the body-side second communication circuit 113. After that, the body CPU 103 transmits a communication completion signal to the body-side second communication circuit 113. Upon reception of the communication completion signal, the body-side second communication circuit 113 sets the signal level of the signal line HREQ to H.

The body CPU 103 executes the hotline communication, described above, at predetermined intervals Tn (e.g., every 1 to a few milliseconds) shown in FIG. 5A. In other words, the lens CPU 203 executes generation processing at predetermined intervals Tn. This allows the body CPU 103 to always hold latest lens data. Using this lens data, the body CPU 103 performs control of, for instance, auto focusing and the like.

(Explanation on Priority of Hotline Communication)

The command data communication and the hotline communication are independent of each other. That is, the command data communication and the hotline communication can be performed simultaneously. However, the lens CPU 203 in the interchangeable lens 200 can not execute two types of processing simultaneously. As a result, the first control processing and the second control processing (hereinafter, these two types of processing are collectively referred to as control processing), which are necessary for the command data communication, and the generation processing, which is necessary for the hotline communication, can not be executed simultaneously.

The lens CPU 203 of the present embodiment gives priority to the generation processing if the control processing and the generation processing occur simultaneously. The case in which the control processing and the generation processing occur simultaneously will now be explained with reference to two examples specifically.

Figure 6:
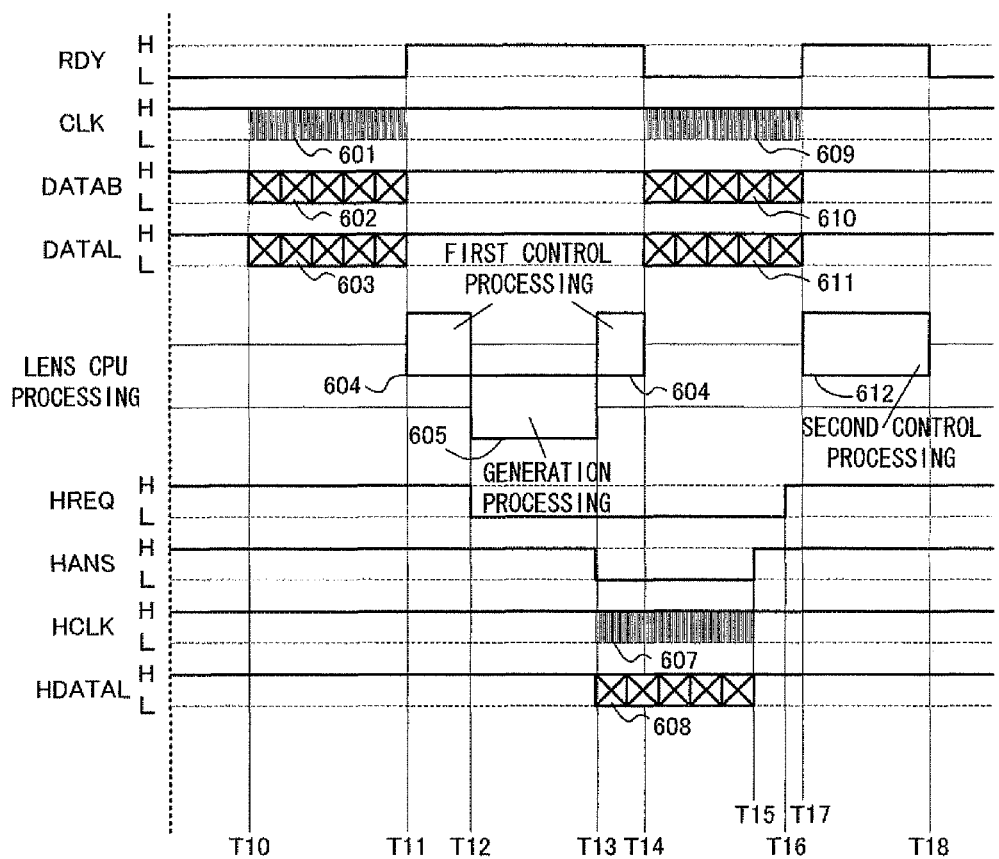
FIG. 6 is a waveform diagram showing generation processing occurring during execution of control processing.

FIG. 6 is a waveform diagram showing the generation processing occurring during execution of the control processing. In FIG. 6, the command data communication is started at a time point T10 in the first place. More specifically, a clock signal 601 and a command packet signal 602 are transmitted by the body-side first communication circuit 112, and a command packet signal 603 is transmitted by the lens-side first communication circuit 212.

After that, transfer of the command packet signal 602 and the command packet signal 603 is completed at a time point T11, and the lens CPU 203 starts a first control processing 604 (e.g., preparation processing of requested lens information). In FIG. 6, however, the body-side second communication circuit 113 sets the signal level of the signal line HREQ from H to L at a time point T12, at which the first control processing 604 is running. In other words, the body CPU 103 transmits a communication start signal to the body-side second communication circuit 113 during execution of the first control processing 604. As a result, a generation processing 605 (e.g., generation processing of position information of the focusing lens 210*d*) occurs at the time point T12, at which the first control processing 604 is being executed.

In such a case, the lens CPU 203 suspends the first control processing 604 at the time point T12, and starts executing the generation processing 605. Then, the lens CPU 203 resumes execution of the suspended first control processing 604 at a time point T13, at which execution of the generation processing 605 is completed. In addition, as a result of completion of the execution of the generation processing 605, the lens-side second communication circuit 213 sets the signal level of the signal line HANS from H to L at the time point T13. In response to this, the body-side second communication circuit 113 starts transmitting a clock signal 607 and the lens-side second communication circuit 213 starts transmitting a lens data signal 608. After that, the transmission of the lens data signal 608 is completed at a time point T15 and the hotline communication is completed at a time point T16.

On the other hand, in the command data communication, upon completion of the first control processing 604 at a time point T14, the body-side first communication circuit 112 starts transmitting a clock signal 609 and a data packet signal 610 and the lens-side first communication circuit 212 starts transmitting a data packet signal 611. As described earlier, since the first transmission path 301 and the second transmission path 302 are independent of each other, communications using those two transmission paths are executed in parallel during a period of time from the time point T14 to the time point T15. After that, the lens CPU 203 starts a second control processing 612 at a time point T17, and the command data communication is completed at a time point T18.

In this manner, the lens CPU 203 suspends the control processing if the generation processing is started during execution of the control processing. After suspending the control processing, the lens CPU 203 further resumes the control processing upon completion of the generation processing. As a result, priority is given to the generation processing by the lens CPU 203 and the transmission of lens data by the lens-side second communication circuit 213 over the control processing by the lens CPU 203 and the transmission and reception of control data by the lens-side first communication circuit 212.

Figure 7:
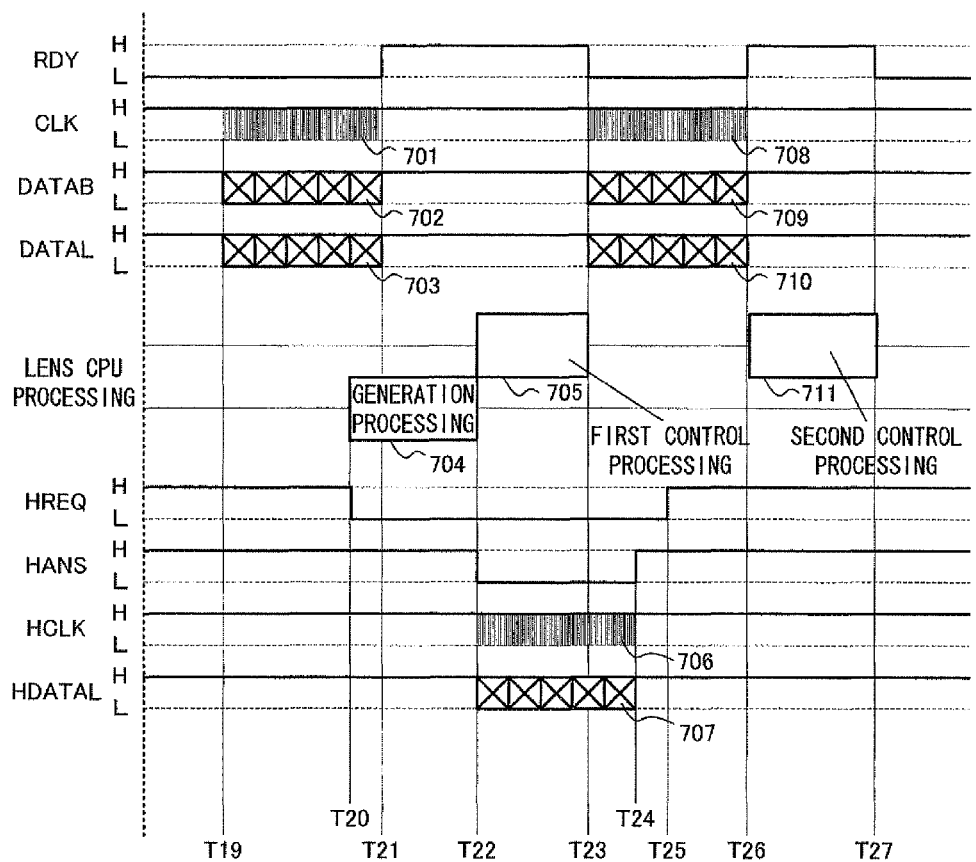
FIG. 7 is a waveform diagram showing control processing occurring during execution of generation processing.

FIG. 7 is a waveform diagram showing the control processing occurring during execution of the generation processing. In FIG. 7, the command data communication is started at time point T19 in the first place. More specifically, a clock signal 701 and a command packet signal 702 are transmitted by the body-side first communication circuit 112 and the command packet signal 703 is transmitted by the lens-side first communication circuit 212.

In FIG. 7, the body-side second communication circuit 113 sets the signal level of the signal line HREQ from H to L at a time point T20, at which those three signals are being transmitted. More specifically, the body CPU 103 transmits the communication start signal to the body-side second communication circuit 113 while those three signals are being transmitted. As a result, the lens CPU 203 starts the generation processing 605 at the time point T2.

Then, transfer of the command packet signal 602 and the command packet signal 603 is completed at a time point T21. That is, a first control processing 705 occurs. The lens CPU 203, however, is executing a generation processing 704 at the time point T21. In the present embodiment, in this case, the lens CPU 203 does not start the first control processing 705. Instead, the lens CPU 203 starts the first control processing 705 at a time point T22, at which the generation processing 704 is completed. As a result, the first control processing 705 is completed at a time point T23, which is behind the time point as it should be. Accordingly, subsequent transmission of a clock signal 708 and a data packet signal 709 by the body-side first communication circuit 112, transmission of the data packet signal 710 by the lens-side first communication circuit 212, and execution of a second control processing 711 by the lens CPU 203 are also behind the time point as it should be. In other words, a longer period of time is required for the command data communication than the period of time required for the case in which the first control processing 705 and the generation processing 704 do not occur simultaneously.

On the other hand, the hotline communication progresses similarly to the case shown in FIG. 5. More specifically, transmission of a clock signal 706 and a lens data signal 707 is started at the time point T22, at which the execution of the generation processing 704 is completed, and the transmission of those signals is completed at a time point T24, Then, the hotline communication is completed at a time point T25. The length of time from the time point T20 to the time point T25 is the same as that from the time point T6 to the time point T9, which is shown in FIG. 5.

In this manner, the lens CPU 203 does not start the control processing during execution of the generation processing. The lens CPU 203 later starts the control processing at a time point at which the generation processing is completed. As a result, priority is given to the generation processing by the lens CPU 203 and the transmission of lens data by the lens-side second communication circuit 213 over the control processing by the lens CPU 203 and the transmission and reception of control data by the lens-side first communication circuit 212.

The following operations and advantageous effects can be achieved by the camera system according to the first embodiment explained above.

(1) The lens CPU 203 gives priority to the generation processing to generate lens data transmitted through the second transmission path 302 over the predetermined control processing based upon the control data received through the first transmission path 301. This allows communications to be normally performed even if the control processing and the generation processing for controlling the first transmission path 301 and the second transmission path 302, respectively, occur simultaneously.

(2) The lens CPU 203 suspends the control processing if the generation processing is started during execution of the control processing. This allows lens data to be transmitted to the camera body 100 without any delay.

(3) After suspending the control processing, the lens CPU 203 resumes the control processing upon completion of the generation processing. This prevents the command data communication from breaking down, despite priority given to execution of the generation processing.

(4) The lens CPU 203 does not start the control processing during execution of the generation processing. This allows lens data to be transmitted to the camera body 100 through the hotline communication without any delay.

(5) The control data is constituted with a plurality of pieces of partial data, and the lens CPU 203 executes the control processing based upon the partial data every time the lens-side first communication circuit 212 receives the partial data. This allows the control processing to be executed in small steps, thereby allowing idle time of the lens CPU 203 to be used more effectively.

The following variations are within a scope of the present invention, and one or more of the variations can be combined with the embodiment described above.

(Variation 1)

The command data communication may not be a full-duplex communication. The present invention can be applied at least as long as the control data can be transmitted from the camera body 100 to the interchangeable lens 200.

(Variation 2)

The control data to be transmitted in the command data communication may be divided into more than two pieces of partial data, and may not be divided into a plurality of pieces of partial data. In addition, the length of the control data may be different from that explained in the embodiment described above. For example, the control data may be arranged to be variable.

(Variation 3)

The instruction from the body CPU 103 to the lens CPU 203, which is indicated by the command packet, may be one other than that explained in the embodiment described above. For instance, it may be an instruction to drive a member (e.g., the zooming lens, the image blur correction lens, the aperture, or the like) other than the focusing lens 210d or an instruction to transmit information (e.g., focal length information (zoom position information), aperture position information, lens property information (optical aberration information), or the like) other than the model name of the interchangeable lens 200. In addition, the contents of the first control processing and the second control processing may be different from those of the embodiment described above.

(Variation 4)

The structure of the first transmission path 301 and the second transmission path 302 is not limited to that shown in FIG. 3. For instance, there may be a signal line other than the signal line shown in FIG. 3. In addition, the communication procedures of the command data communication and the hotline communication may be different from those shown in FIG. 4 and FIG. 5.

(Variation 5)

The data to be transmitted from the interchangeable lens 200 to the camera body 100 in the hotline communication is not limited to the position information of the focusing lens 210d. It may be arranged to transmit, for example, the position information of the aperture, the position information of the image blur correction lens, or the position information of the zooming lens. In this case, it may be arranged to transmit any one of those pieces of information, or it may be arranged to transmit those plurality of pieces of information as a set.

(Variation 6)

While in the embodiment described above, the communication interface is provided individually with respect to each of the two communications (the hotline communication and the command data communication), those may be integrally formed. More specifically, the lens-side first communication circuit 212 and the lens-side second communication circuit 213 may be integrally formed in terms of the interchangeable lens side. Similarly, the body-side first communication circuit 112 and the body-side second communication circuit 113 may be integrally formed in terms of the camera body side.

In addition, a body-side control section and a lens-side control section, in which a function of each of those communication interfaces is incorporated, may be used in place of the body CPU 103 and the lens CPU 203.

(Variation 7)

In the embodiment described above, the explanation was made on the camera system which is constituted with the camera body 100 and the interchangeable lens 200, However, the present invention is not limited to a camera system. The structure (structure on the camera body side) explained in the embodiment described above can also be applied to electronic devices as long as the electronic devices include a mount on which the interchangeable lens 200 can be attached and detached, can communicate with the interchangeable lens 200, and can supply electric power to the interchangeable lens. Such electronic devices include a projector, for example. A projector system similar to the embodiment described above can be achieved by configuring a projection lens of the projector as a removable, interchangeable projection lens.

(Variation 8)

In the present embodiment, a description was made on an image blur correction mechanism that includes the image blur correction lens 210e, which can move in a direction including the components perpendicular to the optical axis of the optical system 210, and blur correction is performed by driving the image blur correction lens 210e. However, the image blur correction mechanism is not limited to the one described above, and may be one that performs image blur correction by rotating (swinging) the image blur correction optical system in the pitching direction and the yawing direction of the camera system.

The above described embodiments are examples, and various modifications can be made without departing from the scope of the invention.

What is claimed is:

1. An interchangeable lens to be removably attached to a camera body, comprising:
    a receiving device that receives predetermined control data from the camera body through a first transmission path;
    a control device that executes predetermined control processing based upon the control data upon reception of the control data by the receiving device;
    a generation device that executes at predetermined intervals generation processing for generating predetermined lens data which indicates an operating state of the interchangeable lens;
    a transmission device that transmits the lens data to the camera body through a second transmission path, which is different from the first transmission path, upon generation of the lens data by the generation device; and
    a prioritizing device that gives priority to the generation processing by the generation device over the control processing by the control device.

2. An interchangeable lens according to claim 1, wherein:
    the prioritizing device causes the control device to suspend the control processing if the generation processing by the generation device is started during execution of the control processing by the control device.

3. An interchangeable lens according to claim 2, wherein:
    after suspending the control processing by the control device, the prioritizing device resumes the control processing upon completion of the generation processing by the generation device.

4. An interchangeable lens according to claim 1, wherein:
    the prioritizing device does not cause the control device to start the control processing during execution of the generation processing by the generation device.

5. An interchangeable lens according to claim 1, wherein:
    the control device and the generation device include a common processing device that executes the control processing and the generation processing.

6. An interchangeable lens according to claim 5, wherein:
    the prioritizing device causes the control device to suspend the control processing if the generation processing by the generation device is started during execution of the control processing by the control device.

7. An interchangeable lens according to claim 6, wherein:
    after suspending the control processing by the control device, the prioritizing device resumes the control processing upon completion of the generation processing by the generation device.

8. An interchangeable lens according to claim 5, wherein:
the prioritizing device does not cause the control device to start the control processing during execution of the generation processing by the generation device.

9. An interchangeable lens according to claim 5, wherein:
the control data is constituted with a plurality of pieces of partial data; and
the control device executes the control processing based upon the partial data every time the partial data is received by the receiving device.

10. An interchangeable lens according to claim 5, wherein:
the generation processing includes processing for outputting to the transmission device a transmission instruction signal which indicates a transmission instruction of the lens tiata having been generated; and
the transmission device, upon input of the transmission instruction signal, transmits the generated lens data to the camera body through the second transmission path.

11. An interchangeable lens according to claim 5, further comprising:
a response data transmission device that transmits response data corresponding to the predetermined control data to the camera body through the first transmission path, wherein;
the first transmission path is a full-duplex transmission path which allows therethrough transmission of the response data by the response data transmission device along with reception of the predetermined control data by the receiving device.

12. An interchangeable lens according to claim 1, wherein:
the control data is constituted with a plurality of pieces of partial data; and
the control device executes the control processing based upon the partial data every time the partial data is received by the receiving device.

13. An interchangeable lens according to claim 1, wherein:
the generation processing includes processing for outputting to the transmission device a transmission instruction signal which indicates a transmission instruction of the lens data having been generated; and
the transmission device, upon input of the transmission instruction signal, transmits the generated lens data to the camera body through the second transmission path.

14. An interchangeable lens according to claim 1, further comprising:
a response data transmission device that transmits response data corresponding to the predetermined control data to the camera body through the first transmission path, wherein;
the first transmission path is a full-duplex transmission path which allows therethrough transmission of the response data by the response data transmission device along with reception of the predetermined control data by the receiving device.

* * * * *